Dec. 8, 1936.  H. HARVEY ET AL  2,063,375
WINDSHIELD WIPER
Filed June 5, 1934
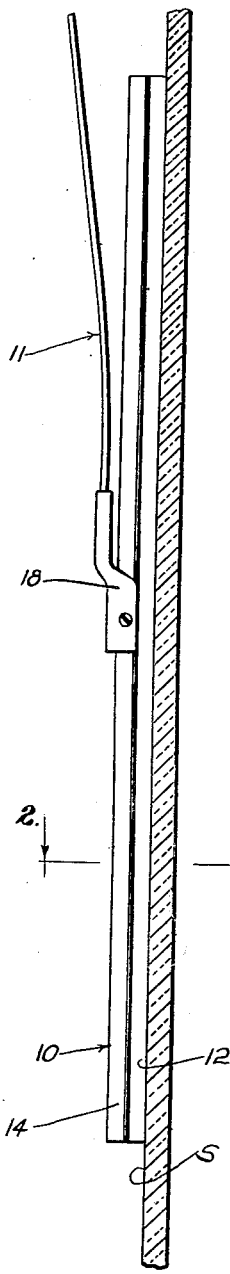
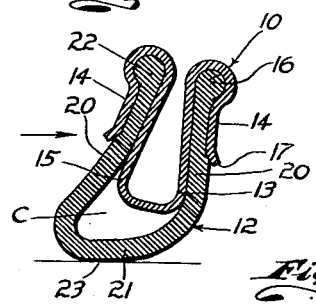
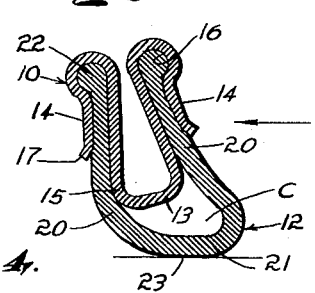
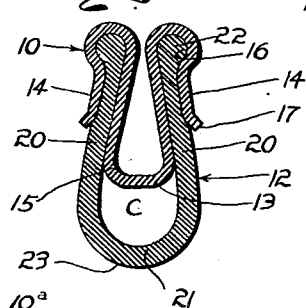
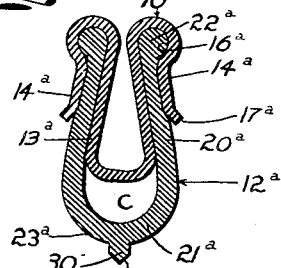
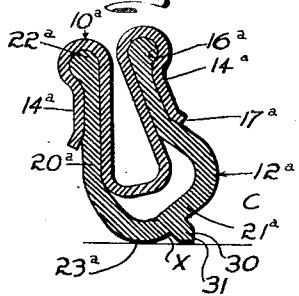
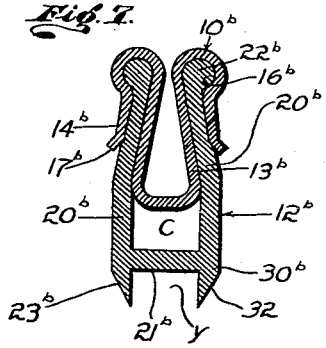
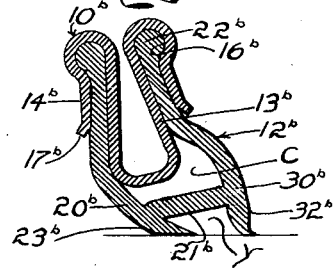
Inventors
Herbert Harvey
and Samuel Malis
by Wm H Capwell
Their Attorney Patented Dec. 8, 1936

2,063,375

UNITED STATES PATENT OFFICE 2,063,375

WINDSHIELD WIPER

Herbert Harvey and Samuel Malis, Los Angeles, Calif., assignors to Leo M. Harvey, Los Angeles, Calif.

Application June 5, 1934, Serial No. 729,096

4 Claims. (Cl. 15—245)

This invention relates to a wiper for cleaning moisture, etc., from windows, windshields, and the like. A general object of this invention is to provide an improved inexpensive and particularly efficient wiper for cleaning windshields and the like.

The windshield cleaners employed on automobiles and other vehicles usually embody one or more wipers movable across the surface of the windshield to remove the moisture therefrom and thus provide a clear, unobstructed field of vision for the driver and other occupants of the vehicle. The wipers now in common use usually consist of a strip of rubber clamped between the flanges of a metal backing or a laminated assembly of a plurality of such rubber strips clamped between the flanges of a metal backing. The rubber strip or strips project from the metal backing to engage the surface of the windshield and as the wiper is moved back and forth across the windshield the rubber strip or strips flex in one direction and then the other. The flexure of the rubber strip or strips occurs almost entirely along the line where they leave the metal backing and the alternate flexing in opposite directions along this single line of flexure soon weakens the strips, reduces their resiliency and ultimately results in their failure.

An object of this invention is to provide a wiper for cleaning or removing moisture, etc., from windshields and the like that embodies a flexible element for engaging the surface to be cleaned that flexes at different points or zones as the wiper is moved back and forth across the surface, so that it is long wearing and particularly efficient in operation.

Another object of the invention is to provide a wiper of the character mentioned that has a chamber or air space within the flexible wiping element that allows the element to automatically conform to irregularities on the surface being cleaned and allows the element to move over the surface smoothly and evenly without chattering.

Another object of the invention is to provide a wiper for use on a windshield cleaner or the like that embodies a single one-piece or integral flexible wiping element that will not separate or become distorted or misshapen.

Another object of the invention is to provide a wiper of the character mentioned including a flexible wiping element that is substantially U-shaped or channel shaped in cross section having spaced side parts gripped by a metal backing to flex independently during the operation of the wiper, the closed end or side of the flexible element which engages the surface to be cleaned being spaced from the backing leaving an internal space which permits the free flexing of the element.

Another object of the invention is to provide a wiper of the character mentioned in which the flexible wiping element is formed and arranged to prevent contact of the metal backing with the surface being wiped.

A further object of the invention is to provide a wiper of the character described that is very simple and inexpensive of manufacture.

Other objects and features of the invention will be better and more fully understood from the following detailed description of typical forms and applications of the invention, throughout which description reference may be had to the accompanying drawing, in which:

Fig. 1 is a side elevation of one form of wiper provided by the present invention showing it in operating position on a surface to be cleaned. Fig. 2 is an enlarged transverse detailed sectional view taken as indicated by line 2—2 on Fig. 1. Fig. 3 is a view similar to Fig. 2 showing the wiper moving in the opposite direction. Fig. 4 is a transverse detailed sectional view of the wiper shown in Figs. 1 to 3 apart or disengaged from the surface. Fig. 5 is a transverse detailed sectional view of another form of the invention. Fig. 6 is a transverse detailed sectional view of the wiper illustrated in Fig. 5 showing it in operative position on a surface. Fig. 7 is a transverse detailed sectional view of still another form of the invention and Fig. 8 is a transverse detailed sectional view of the wiper illustrated in Fig. 7 showing it in operative position.

The form of the invention illustrated in Figs. 1 to 4, inclusive, of the drawing includes, generally, a backing or holder 10 adapted to be carried by the arm 11 of a windshield cleaner, and a flexible element 12 on the backing or holder 10 for engaging the surface S to clean the same.

The backing or holder 10 is provided to carry or support the flexible element 12 for movement across the surface S. The holder 10 is substantially rigid being formed of metal or the like. In practice the holder 10 may be formed of sheet metal or the like. The holder 10 is of peculiar or distinctive cross sectional configuration having a central longitudinally extending tongue 13 and side flanges 14 extending along the rear or outer edges of the tongue. The tongue 13 and flanges 14 preferably extend throughout the entire length of the holder. The sides 15 of the tongue 13 are preferably flat while the forward end of the tongue is round or provided with rounded corner portions where it joins the sides 15. In the construction illustrated in the drawing the sides 15 of the tongue diverge forwardly or toward the surface S. The flanges 14 are provided to grip the flexible element 12 and clamp its side parts against the sides of the tongue 13. The major portions of the flanges 14 are preferably substantially parallel with the sides 15 of the tongue. The portions of the holder 13 where the flanges 14 join the tongue 13 are preferably rounded outwardly to leave enlarged spaces 16. In accordance with the invention the flanges 14 terminate substantial distances from the forward or outer end of the tongue 13, that is the tongue 13 projects forwardly beyond the flanges 14. Outwardly turned beads or lips 17 are provided on the edges of the flanges 14. The backing or holder 10 just described may be a one piece or integral member and is simple and inexpensive to manufacture.

Means is provided for connecting the holder 10 to the moving arm 11 of the cleaner. In accordance with the broader aspects of the invention any suitable or typical means may be provided for this purpose. In the particular case illustrated in the drawing a channeled or yoke-like member 18 is provided on the end of the arm 11. The member 18 is loosely pivotally connected to the holder at a point equally spaced between its ends. The connection of the member 18 with the wiper is such that the wiper has limited lateral play relative to the arm 11 and is free to tilt or rock to an inclined position at the start of each movement or stroke of the arm. The arm 11 is yieldingly urged toward the surface S in the well-known manner so that the wiping element 12 has proper engagement with the surface.

The flexible wiping element 12 is carried by the holder 10 to project beyond the forward side of the tongue 13 and have sliding or wiping engagement with the surface S. The element 12 is formed of rubber or rubber composition and it is a feature of the invention that the element is a single continuous or integral part. In accordance with the invention the element 12 is substantially U-shaped or channel-shaped in transverse cross section having spaced side parts 20 and a connecting part or outer part 21. The wiping element 12 may be formed or shaped from a flat blank. However, it is preferred to mold it to initially be of substantially U-shaped cross-section. The spaced side parts 20 of the element 12 are gripped or clamped between the flanges 14 and the sides 15 of the tongue. The inner surfaces of the side parts 20 which are preferably flat are adapted to lie flat against the opposite sides of the tongue 13 as illustrated in Fig. 4 of the drawing. The side parts 20 of the member 12 are securely gripped and held between the flanges 14 and the tongue 13 but are not gripped so tightly that the element is excessively distorted. Rounded enlargements or beads 22 extend along the longitudinal edges of the side parts 20 and are received in the enlarged spaces 16 to further lock the element to the holder 10.

It is an important feature of the invention that the flexible element 12 is proportioned to project a substantial distance beyond the forward or outer end of the tongue 13 and thus leave a space or chamber C in the wiper. The opening or space C permits the free flexing of the element 12 and allows the element to adapt itself to various positions and movements during operation of the wiper. In the particular form of the invention being described the outer portion 21 of the element 12 presents a substantially cylindrically curved external surface 23. The divergence of the side parts 20 gripped by the holder, as described above, aids in giving the portion 21 its curved surface 23. It is to be particularly noted that the wiping element 12 completely covers or encases the forward end of the tongue which projects beyond the flanges 14 and, therefore, positively prevents contact of the flanges with the windshield or surface S. In the form of the invention disclosed in Figs. 1 to 4 of the drawing the wiping surface 23 is plain and smooth and is without ribs or fins. The contact of the surface 23 with the surface S of course distorts the free or projecting portion of the element 12 to some extent, and the degree or extent of this distortion depends upon the pressure exerted on the arm 11 and the character of the surface S being cleaned.

In the operation of the form of wiper illustrated in Figs. 1 to 4, inclusive, of the drawing, the wiper is alternately moved in opposite directions by the arm 11 and, as previously described, is free to tilt to angular positions such as illustrated in Figs. 2 and 3 during these movements. The surface 23 of the flexible element 12 slidably engages or bears on the surface S to effectively wipe the surface S and remove moisture, etc., therefrom. During its movement across the surface S the advancing or leading side 20 of the flexible element bears against and is supported by the leading side 15 of the tongue at the forward extremity of the tongue. From this point to the point of contact of the surface 23 with the surface S the leading side of the element 12 is bent or flexed to have a slow or gradual curve such as illustrated in Figs. 2 and 3 of the drawing. The trailing side 20 of the element 12 is free to flex or bend outwardly away from the trailing side 15 of the tongue from a point or line opposite the edge of the trailing flange 14. The trailing side 20 of the flexible element 12 curves or inclines rearwardly relative to the direction of movement until it joins the portion 21 at a comparatively sharp curve. The arrows in Figs. 2 and 3 of the drawing indicate the direction of movement of the wiper across the surface S. The flexing of the element 12 during its operation will be clearly understood from an inspection of these figures of the drawing.

The surface 23 may have extensive engagement with the surface S. However, the extent of this engagement depends upon the pressure placed on the wiper. The chamber or space C within the flexible element 12 allows the element to freely assume the different positions during the movement of the wiper and renders the active or surface engaging portion 21 particularly flexible, whereby it may readily conform to any irregularities that may be present in the surface S. It is to be particularly noted that the flexible element 12 bends or flexes at different points as the wiper is moved in opposite directions. As described above and clearly illustrated in Figs. 2 and 3 of the drawing, the leading side of the element 12 relative to the direction of movement is curved from a point adjacent the forward end of the tongue 13 to the leading line of contact of the surface 23 with the surface S. This curvature may be substantially uniform or symmetrical somewhat as illustrated. The trailing side 20 of the element 12 is free to flex away from the tongue 13 at the edge of the trailing flange 14 which is spaced some distance rearwardly from the forward end of the tongue. This flexing of the trailing side of the element 12 is usually more gradual than that of the leading side and does not occur in the same part of the element. Due to this action or flexing of the element 12 during operation it is not subjected to excessive wear or flexing in any particular place or places, but is subjected to well distributed flexure.

The form of the invention illustrated in Figs. 5 and 6 of the drawing includes a holder 10ª which may be identical with the holder 10 and a flexible element 12ª. The flexible element 12ª is substantially identical with the element 12 described above, having spaced side parts 20ª gripped between the tongue 13ª and the flanges 14ª of the holder. The transversely curved outer part 21ª of the flexible wiping element is provided with a central longitudinal rib or fin 30. The fin 30 is provided to have trailing wiping engagement with the surface S as the wiper is operated across the surface. The fin 30 may be integral with the flexible element 12ª as illustrated in the drawing. The base portion of the fin 30 may have parallel sides while the outer portion of the fin preferably has divergent faces 31 meeting at an edge.

During the operation of the wiper illustrated in Figs. 5 and 6 of the drawing the forward or leading side of the flexible element 12ª bears against the leading side of the tongue 13ª and then curves rearwardly and toward the surface S. The curved outer surface 23ª of the portion 21ª has wiping engagement with the surface S and the portion 21ª slopes or inclines outwardly and rearwardly from the zone of this engagement. The fin 30 projects rearwardly from this inclined part to have one of its convergent faces 31 slidably engage the surface S. The engagement of the fin 30 with the surface S provides or leaves a recess or channel X between the fin and the portion 21ª engaging the surface. This recess or channel X is adapted to receive and trap moisture from the surface S and, of course, is open at the opposite ends of the wiper for the free discharge of this fluid. Upon the wiper being operated in the direction opposite to that illustrated in Fig. 6 the flexible element 12ª is bent or flexed in a reverse manner. The flexible element 12ª has spaced wiping engagement with the surface S and is, therefore, particularly efficient in wiping or cleaning the surface. The element 12ª is long wearing as its parts are flexed at different points or zones during the alternate movements of the wiper in the same manner as the element 12ª.

Fig. 7 and 8 of the drawing illustrates a form of the invention involving a holder 10ᵇ and a flexible wiping element 12ᵇ. The holder 10ᵇ may be identical with the holder 10. The flexible wiping element 12ᵇ is substantially U-shaped in transverse cross section including spaced side parts 20ᵇ and a connecting part 21ᵇ. The element 12ᵇ is preferably an integral member and is moulded or shaped for arrangement on the holder 10ᵇ. The side parts 20ᵇ are gripped or held between the flanges 14ᵇ and the sides of the tongue 13ᵇ. The side parts 20ᵇ project outwardly from the forward end of the tongue and their projecting portions are initially substantially parallel. The connecting part 21ᵇ forms a web or bridge connecting the side parts 20ᵇ and may initially be normal to the side parts as illustrated in Fig. 7 of the drawing. The side parts 20ᵇ have extensions or continuations projecting beyond the connecting part 21ᵇ forming spaced ribs or fins 30ᵇ. The fins 30ᵇ have pitched or inclined outer surfaces 32 which join the inner sides of the fins at comparatively sharp edges. The surfaces 32 are adapted to slidably engage or wipe the surface S as the wiper is operated across the surface.

When the wiper illustrated in Figs. 7 and 8 of the drawing is moved across the surface S the leading side 20ᵇ of the wiping element bears against the leading side of the tongue 13ᵇ and its projecting portion is flexed rearwardly and toward the surface S. Due to this rearward flexing of the leading side 20ᵇ the surface 32 of the leading fin 30ᵇ may have effective wiping engagement with the surface S. The trailing side 20ᵇ of the wiping element flexes or curves rearwardly and outwardly away from the tongue 13ᵇ. The portion 21ᵇ which connects the two side parts causes the trailing side part to be curved or rounded outwardly and rearwardly, as illustrated in Fig. 8 of the drawing. This flexing of the rear or trailing side 20ᵇ is not sufficient, however, to disengage the trailing fin 32 from the surface S. The edge portion of the trailing fin 32 has wiping contact with the surface S and the spaced surface engaging fins 30ᵇ provide a recess or channel Y between them for trapping or carrying liquid from the surface S. The simple one piece wiping element 12ᵇ illustrated in Figs. 7 and 8 of the drawing is particularly efficient in wiping the surface S and is long wearing.

Having described only typical forms and applications of our invention, we do not wish to be limited or restricted to the specific forms and applications herein set forth, but wish to reserve to ourselves any modifications or variations that may appear to those skilled in the art or fall within the scope of the following claims.

Having described our invention, we claim:

1. A windshield wiper including an elongate substantially rigid holder comprising side flanges and a longitudinal tongue projecting forwardly from between the flanges and having forwardly diverging sides, and a wiping element of rubber comprising longitudinal side parts clamped between the flanges and both sides of the tongue and projecting forwardly from the tongue, and a part connecting said side parts and adapted to have wiping contact with the surface to be wiped, the last named part being spaced from the tongue to provide an opening in the element which allows the free flexing of its said parts.

2. A windshield wiper including a holder comprising a substantially channel shaped tongue having forwardly diverging sides, and longitudinal flanges projecting outwardly along the rear edges of the tongue and then forwardly to provide channels at the opposite sides of the tongue, and a flexible wiping element comprising side parts received in the channels and clamped against the tongue by the flanges, beads on the rear edges of the side parts clamped in the channels to retain the side parts therein, and an outer part connecting the side parts at a point spaced forwardly from the tongue and adapted to engage the windshield.

3. A windshield wiper including a holder comprising a substantially channel shaped tongue having forwardly diverging sides, and longitudinal flanges projecting outwardly along the rear edges of the tongue and then forwardly in substantial parallelism to said sides to provide channels at the opposite sides of the tongue, and a flexible wiping element comprising side parts received in the channels and clamped against the tongue by the flanges, the forward edges of the flanges being turned outwardly to allow free flexing of the side parts, and an outer part connecting the side parts and spaced forwardly from the tongue to engage the windshield.

4. A windshield wiper including a holder comprising a substantially channel shaped tongue having rearwardly converging sides, and flanges projecting outwardly at the rear end of the tongue in spaced relation to said sides of the tongue to provide channels at the opposite sides of the tongue, and a flexible wiping element of substantially U-shaped cross section having its side parts clamped in said channels between the sides of the tongue and the flanges, and having its outer part which connects the side parts spaced forwardly from the tongue to engage the windshield.

HERBERT HARVEY.
SAMUEL MALIS.